(12) United States Patent
Gérard et al.

(10) Patent No.: US 11,959,798 B2
(45) Date of Patent: Apr. 16, 2024

(54) SYSTEM AND A METHOD FOR NOISE DISCRIMINATION

(71) Applicant: SYSTÈMES DE CONTRÔLE ACTIF SOFT DB INC., Québec (CA)

(72) Inventors: Anthony Gérard, Montreal (CA); Marc Poirier, Montréal (CA); Michel Pearson, Québec (CA); Pierre-Claude Ostiguy, Chambly (CA)

(73) Assignee: SYSTÈMES DE CONTRÔLE ACTIF SOFT DB INC., Quebec (CA)

( * ) Notice: Subject to any disclaimer, the term of this patent is extended or adjusted under 35 U.S.C. 154(b) by 522 days.

(21) Appl. No.: 16/604,505

(22) PCT Filed: Apr. 5, 2018

(86) PCT No.: PCT/CA2018/050416
§ 371 (c)(1),
(2) Date: Oct. 10, 2019

(87) PCT Pub. No.: WO2018/187859
PCT Pub. Date: Oct. 18, 2018

(65) Prior Publication Data
US 2020/0149951 A1 May 14, 2020

Related U.S. Application Data

(60) Provisional application No. 62/484,061, filed on Apr. 11, 2017.

(51) Int. Cl.
*G01H 3/14* (2006.01)
*G01P 5/00* (2006.01)
*G01P 13/02* (2006.01)

(52) U.S. Cl.
CPC ............. *G01H 3/14* (2013.01); *G01P 5/00* (2013.01); *G01P 13/02* (2013.01)

(58) Field of Classification Search
CPC .............. G01H 3/14; G01P 13/02; G01P 5/00
See application file for complete search history.

(56) References Cited

U.S. PATENT DOCUMENTS

| 7,876,918 B2 * | 1/2011 | Luo ...................... H04R 25/407 |
| | | 29/896.21 |
| 2001/0048297 A1 * | 12/2001 | Medelius ........... G01R 29/0842 |
| | | 324/72 |

(Continued)

FOREIGN PATENT DOCUMENTS

| JP | 58191934 A | * 11/1983 | ............... G01H 3/14 |
| JP | H09105667 | 4/1997 | |

OTHER PUBLICATIONS

International Search Report dated on Jun. 12, 2018, issued in the PCT/CA2018/050416 application.

*Primary Examiner* — Kyle R Quigley
(74) *Attorney, Agent, or Firm* — Lavery Lawyers; Gwendoline Bruneau

(57) ABSTRACT

A method and a system for noise discrimination, the method comprising measuring noise levels of a noise source, measuring noise levels at a target location positioned at a distance from the noise source, measuring wind speed and direction in an area comprising the noise source and the target location, filtering transient short-duration events from the noise levels measured at the noise source, yielding filtered noise levels of the noise source, filtering transient short-duration events from the noise levels measured at the target location, yielding filtered noise levels of the target location, measuring a sound transfer function between the noise source and the target location using the filtered noise levels, comparing the measured sound transfer function with a reference transfer function; and when the difference between the measured transfer function and the reference transfer function is above a predetermined threshold, deter- (Continued)

mining a probability that noise at the location originates from the noise source.

17 Claims, 7 Drawing Sheets

(56) References Cited

U.S. PATENT DOCUMENTS

| | | | | |
|---|---|---|---|---|
| 2002/0081979 A1* | 6/2002 | Okuya | ............... | G01V 1/223 |
| | | | | 455/67.11 |
| 2003/0039369 A1* | 2/2003 | Bullen | ............... | G01H 3/125 |
| | | | | 381/71.7 |
| 2004/0081322 A1* | 4/2004 | Schliep | ............... | G08G 1/04 |
| | | | | 381/94.1 |
| 2011/0175356 A1* | 7/2011 | Nielsen | ............ | F03D 7/0296 |
| | | | | 290/44 |
| 2013/0258813 A1* | 10/2013 | Herre | ................. | H04R 1/406 |
| | | | | 367/135 |
| 2014/0193257 A1* | 7/2014 | Ormel | ................ | F03D 17/00 |
| | | | | 416/31 |
| 2016/0032893 A1 | 2/2016 | Herrig et al. | | |

* cited by examiner $\theta_v$ Angle of wind direction compared to north
$\theta_{\bar{X}_{MV},B_x}$ Direction of sound propagation, from source towards receiver, compared to north

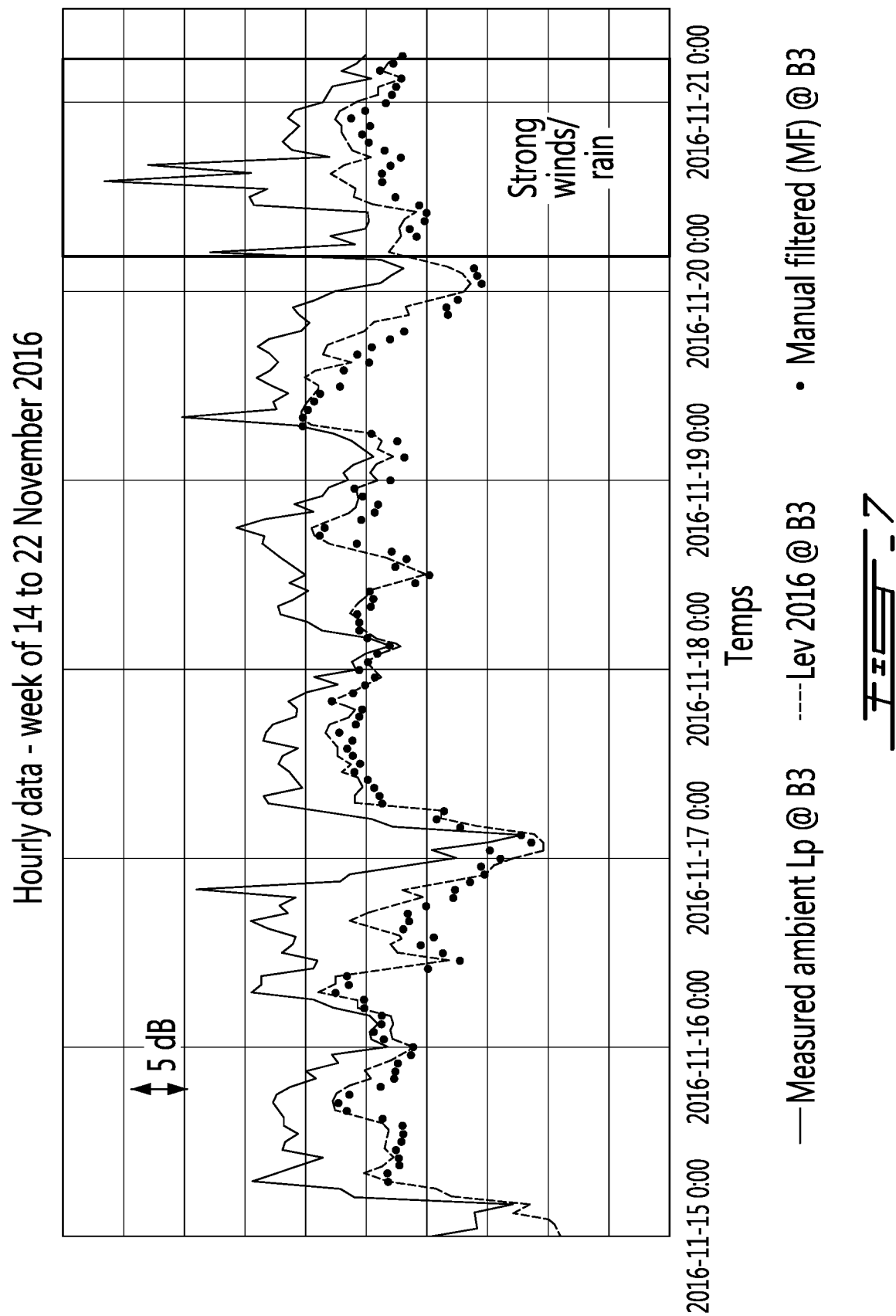

SYSTEM AND A METHOD FOR NOISE DISCRIMINATION

CROSS-REFERENCE TO RELATED APPLICATIONS

This application is a National Entry Application of PCT application no PCT/CA2018/050416 filed on Apr. 5, 2018 and published in English under PCT Article 21(2), which itself claims benefit of U.S. provisional application Ser. No. 62/484,061, filed on Apr. 11, 2017. All documents above are incorporated herein in their entirety by reference.

FIELD OF THE INVENTION

The present invention relates to noise measurements. More precisely, the present invention relates to noise discrimination.

BACKGROUND OF THE INVENTION

Typically, a plant may operate day and night, 365 days per year. Noise surveys may be required by authorities. Sound level measurement stations are then used to measure and monitor the noise from the plant activities for regulatory purposes.

A number of system and methods have been developed for noise monitoring, and a number of sound level indexes are used to assess noise levels.

Equivalent continuous sound level (Leq) is used to describe sound levels that vary over time, resulting in a single decibel value which takes into account the total sound energy over the period of time of interest. It is common practice to measure noise levels using the A-weighting setting built into all sound level meters, known as LAeq.

There is still a need in the art for a system and a method for noise discrimination.

SUMMARY OF THE INVENTION

More specifically, in a said accordance with the present invention, there is provided system comprising at least a first noise monitoring station measuring noise levels of a noise source, at least a second noise monitoring station measuring noise levels at a target location at a distance from the noise source, at least one meteorological station measuring wind speed and direction data in an area comprising the noise source and the target location, and a controller receiving the noise levels from the first and second noise monitoring stations and the wind speed and direction data from the meteorological station, wherein the controller discriminates noise at the target location originating from the noise source based on the measured noise levels and the wind speed and direction data.

There is further provided a method comprising measuring noise levels of a noise source, measuring noise levels at a target location positioned at a distance from the noise source, measuring wind speed and direction in an area comprising the noise source and the target location, filtering transient short-duration events from the noise levels measured at the noise source, yielding filtered noise levels of the noise source, filtering transient short-duration events from the noise levels measured at the target location, yielding filtered noise levels of the target location, measuring a sound transfer function between the noise source and the target location using the filtered noise levels, comparing the measured sound transfer function with a reference transfer function; and when the difference between the measured transfer function and the reference transfer function is above a predetermined threshold, determining a probability that noise at the location originates from the noise source.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 7 shows hourly present index levels (Lev 2016) according to an embodiment of an aspect of the present invention compared to manual filtered noise (MF) levels for station B3, as well as unfiltered, measured ambient levels (dBA).

DESCRIPTION OF THE INVENTION

The present invention is illustrated in further detail by the following non-limiting examples related to a plant located near a town, and operating day and night, 365 days per year.

Figure 3:
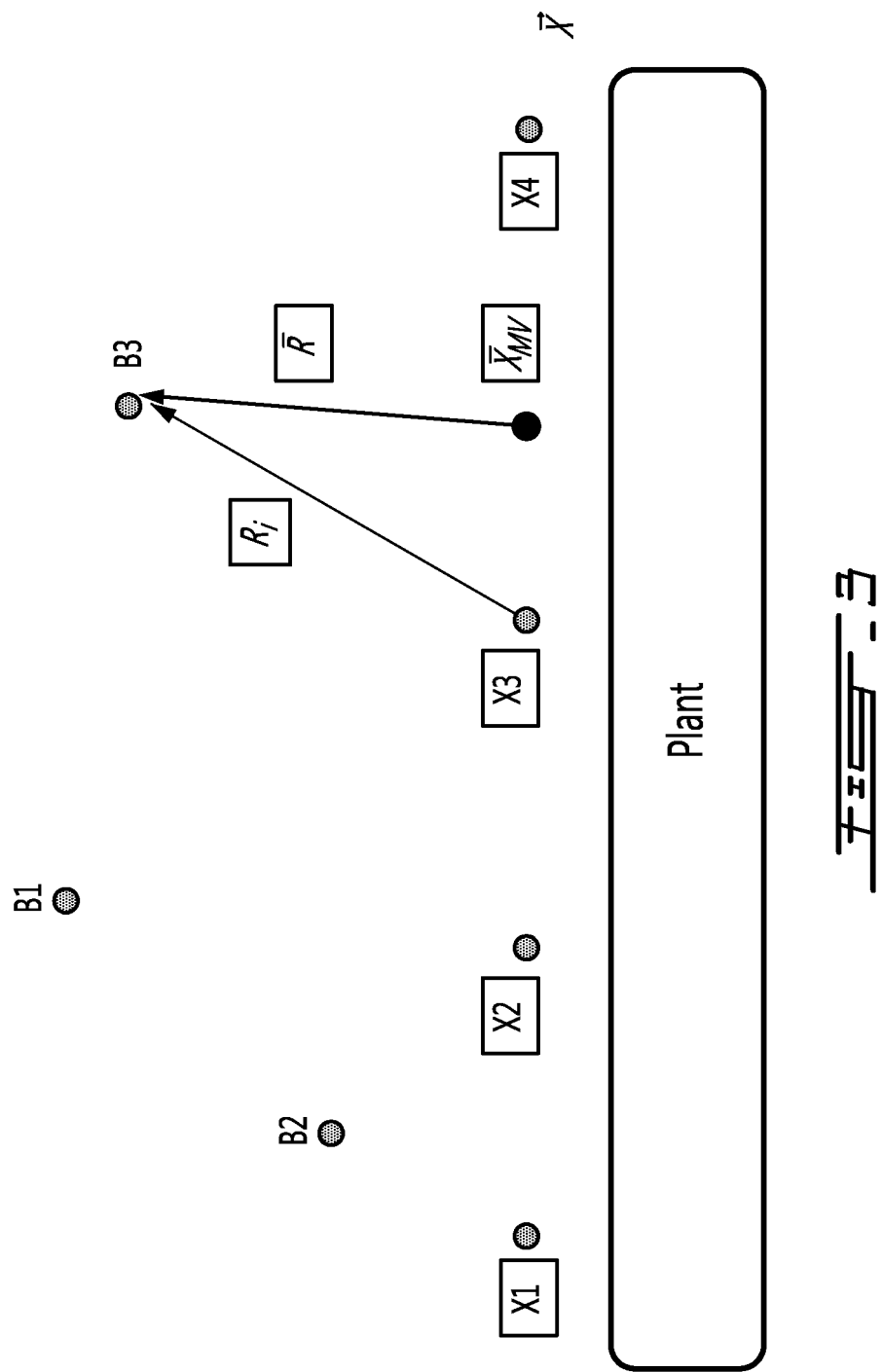
FIG. 3 illustrates the position of microphones in town (B1 to B3) and near the plant (X1 to X4), with examples of location of $\overline{R}$ and $\overline{X}$ used for the estimation of noise contribution at B3 during concentrated activities in a sector of the plant, according to an embodiment of an aspect of the present invention.

Microphones X1 to X4 were installed between the town and the plant as schematically shown in FIG. 3, at positions selected to measure noise levels originating mainly from the plant. Microphones B1 to B3 X4 were positioned in town to measure noise levels in the town, as schematically shown in FIG. 3. Sound levels, as well as audio recordings for listening back to sound events in case of doubts as to the origin of the sounds measured for example, from the microphones B1 to B3 in town were manually filtered in post-processing to filter (MF) noise events that were not associated with the plant activities, such as traffic noise, human activities, animals for example, thereby yielding manual filtered noise (MF) levels.

Such filtering process may be automated using for example (i) a A-weighted 35th-percentile statistical method, yielding a level (LA35%) representing the A-weighted sound level exceeding 35% of a time period (T), taken from the unfiltered sound record, or (ii) a low-pass digital filtering method yielding a filtered level (LF) index.

A study of manual filtered noise (MF) levels versus unfiltered statistical sound levels (LA1% to LA99%) showed that LA35% levels most closely matched manual filtered noise (MF) levels over a period of several weeks.

Figure 1B:
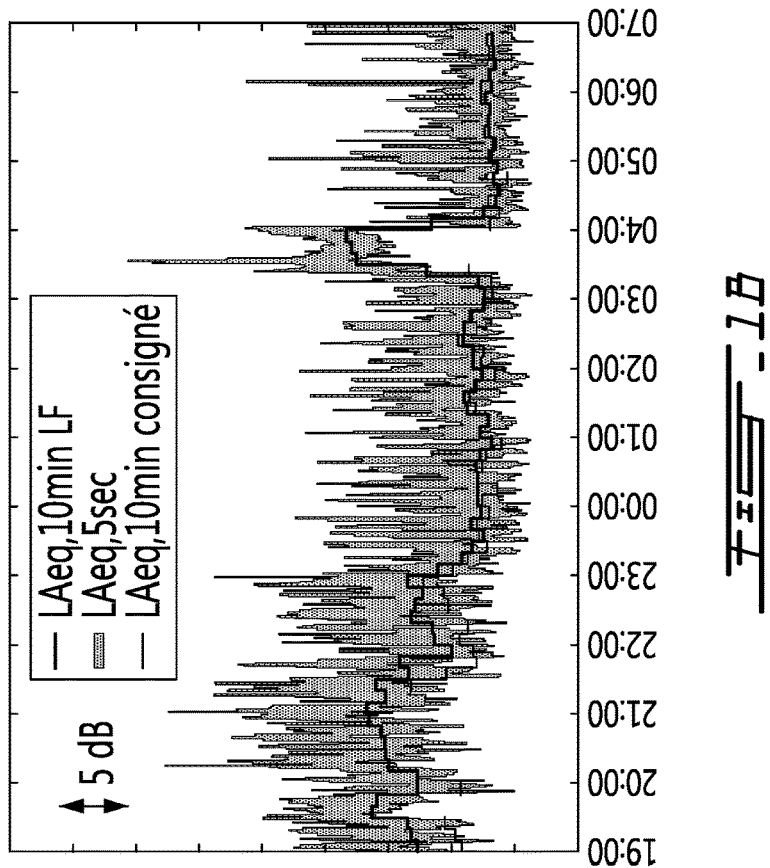
FIG. 1B shows the filtered level (LF) on a night with a significant longer duration noise event occurring in town.
Figure 1A:
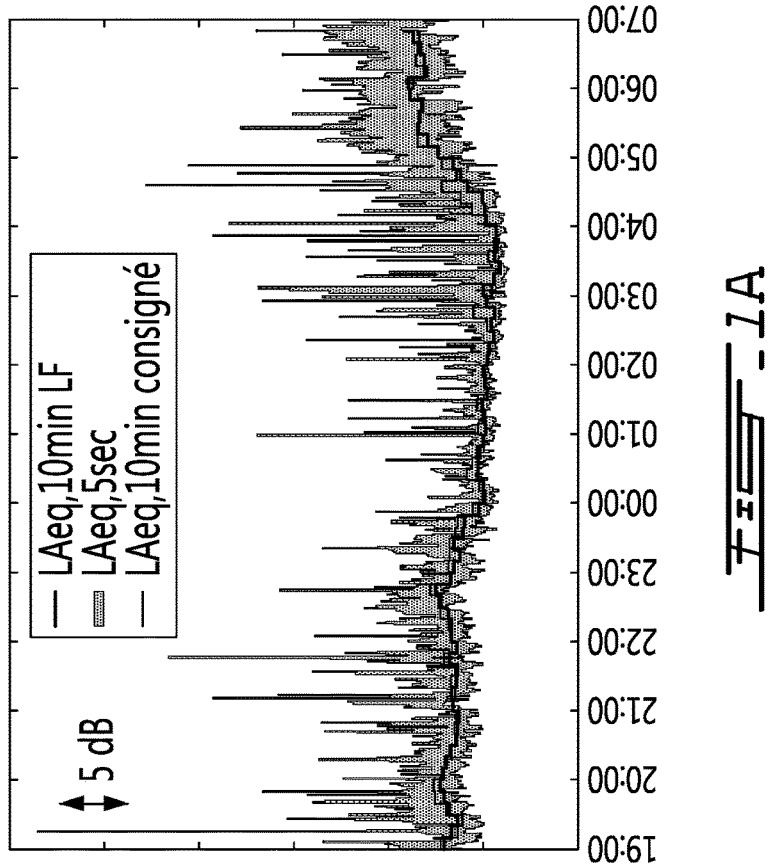
FIG. 1A shows the filtered level (LF) index during a typical night with short-duration noise events occurring in town.

The filtered level (LF) index, obtained using the low-pass digital filtering method, proved to be well suited for filtering out short-duration town events, i.e. of a duration of seconds, up to 20 s for example, depending on the sampling period (see FIG. 1A). However, the low-pass digital filtering method fails to filter longer town events, i.e. of a duration of several minutes (see FIGS. 1B, 1C).

A system according to an aspect of an embodiment of the present disclosure comprises at least one microphone for sound levels recordings and a sound analyser that measures the sound pressure level as a function of time of a noise source, in at least one noise monitoring station for example located near the noise generating source; and at least one microphone for sound levels recordings and a sound analyser that measures the sound pressure level as a function of time, in at least one noise monitoring station for example, at a target location in a neighbouring area where the noise originating from the noise generating source is to be assessed; and a server in communication with each station.

The system further comprises wind speed and direction sensors, in at least one meteorological station, for example, located to measure wind speed and direction in the area comprising the noise source and the target location.

The server centralises data collected by the noise monitoring stations and from the meteorological station, for processing by a controller for example, as described hereinbelow.

Web communication may be used if data are pushed to the server for real time estimation of the noise coming from the noise generating source on an interactive web site for example. If the data do not require real time estimation or web monitoring, acoustic data from the noise monitoring stations and meteorological data from the meteorological station may be stored on a hard drive in the sound analyser of the monitoring stations and in the meteorological station, for later post treatment.

Directional microphones, such as beamforming antennas or shot gun type directional microphones for example, may be used to improve accuracy of the noise assessment, by providing a spatial filter that partly cancels remotely generated noises.

According to an embodiment of a method of the present disclosure, at least one noise monitoring station is positioned near the noise generating source, at least one noise monitoring station is positioned near a target location in a neighbouring area of the noise generating source, so as to measure noise levels at the noise generating source and at the target location respectively, and at least one meteorological station is positioned in the area comprising the noise source and the target location, i. e. in a position submitted to the same overall wind speed and direction than both the noise generating source location and the target location.

Transient short-duration events on all are first filtered out monitoring stations, using a low pass filter as described hereinabove. (step 120, FIG. 5).

Figure 5:
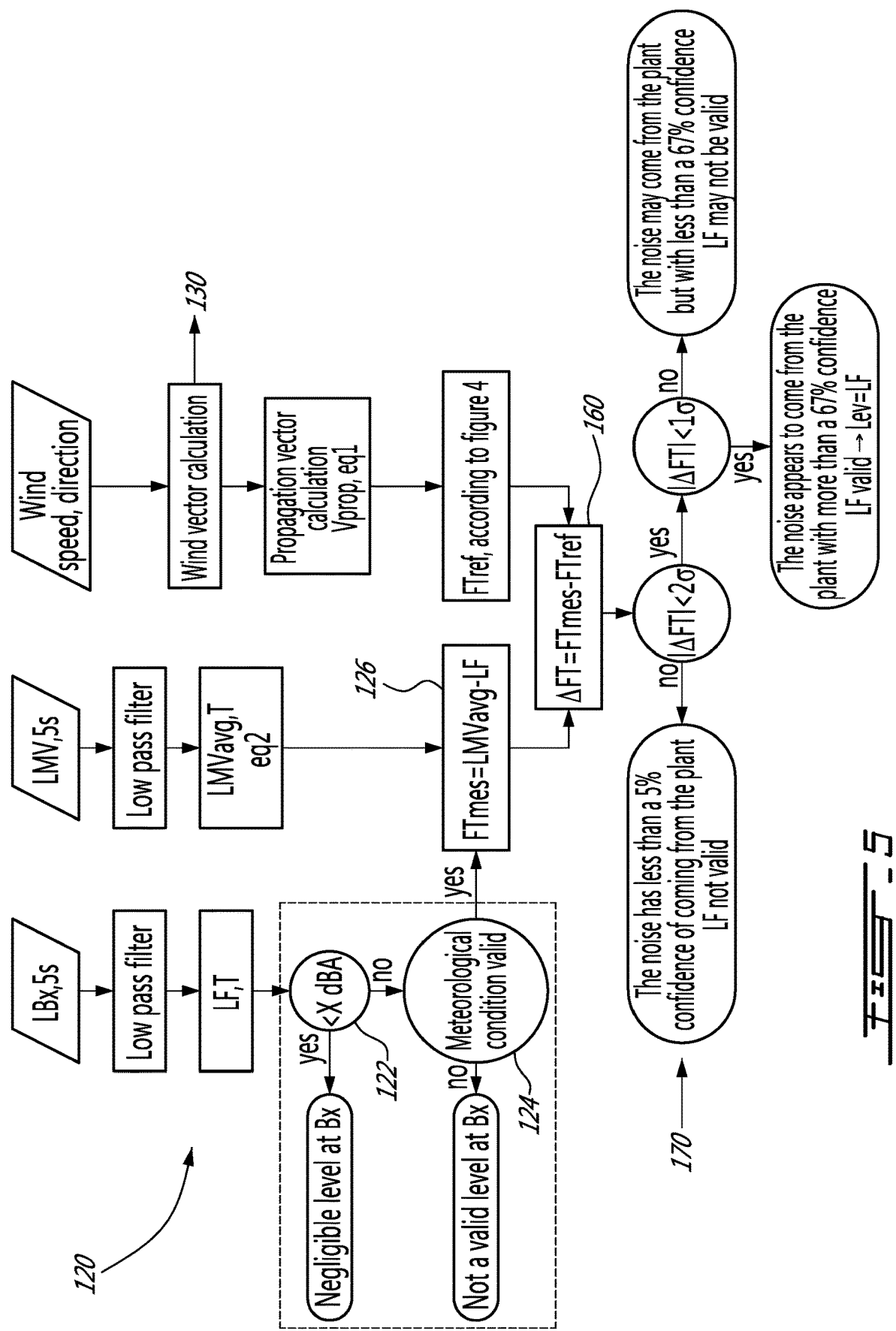
FIG. 5 is a flowchart of a method according to an embodiment of an aspect of the present invention.

Then, for long-duration events that are not filtered by the low-pass filter in step 120, the sound transfer function between the noise source (see X1 to X4 in FIG. 3 for example) and the target location (see B1 to B3 in FIG. 3 for example) is measured (step 126, FIG. 5).

The measured transfer function between the noise source and the target location is then compared to reference transfer functions, i. e. transfer functions measured between the noise source and the target location and stored over long-time periods in a range of meteorological conditions (step 160, FIG. 5).

Wind is found to be a meteorological factor influencing the propagation of sound. For a given wind speed ($V_{vent}$), the wind component ($V_{prop}$) along the axis of sound propagation ($\theta_{\overline{X}_{MV},Bx}$) directly relate the effect of wind direction ($\theta_v$) to sound propagation. The wind component in the sound propagation axis is evaluated as follows:

$$V_{prop} = V_{vent} * \cos(\theta_v - \theta_{\overline{X}_{MV},Bx}) \quad \text{(Relation 1)}$$

Figure 2:
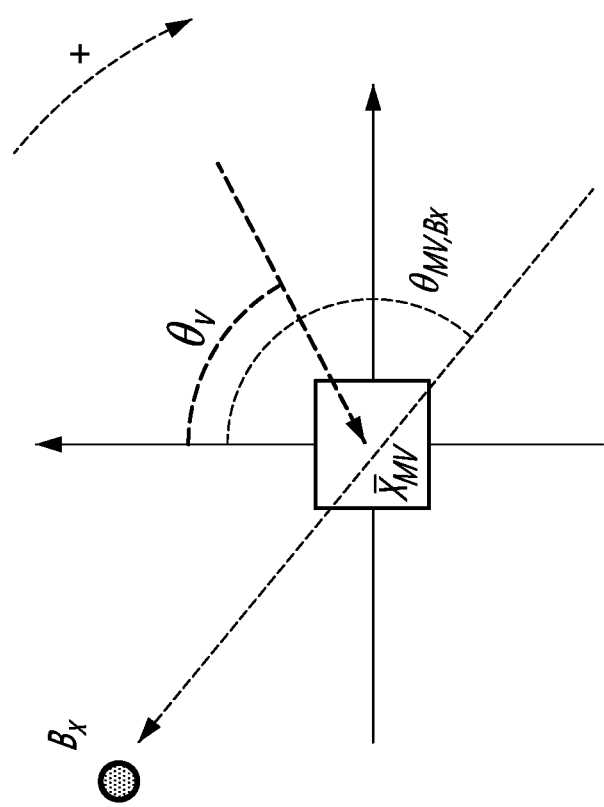
FIG. 2 is a diagrammatic view of an evaluation of the wind component in the sound propagation axis according to an embodiment of an aspect of the present invention.

FIG. 2 illustrates an example with a northeast wind, i.e. a wind which direction has an angle of $\theta_v = 60°$ relative to the North. If the wind speed is $V_{vent} = 2$ ms$^{-1}$ and the sound propagation axis from the sound source $X_{MV}$ to the sound receiver $B_x$ is oriented by $\theta_{\overline{X}_{MV},Bx} = 135°$ relative to the North, the component in the propagation axis is $V_{prop} = 2 \times \cos(60° - 135°) = 0.52$ ms$^{-1}$. The closer $V_{prop}$ is to $V_{vent}$, the more favorable the noise propagation conditions are.

To calculate the sound propagation vector ($\theta_{\overline{X}_{MV},Bx}$) for the sound transmitted between the noise source and one of the microphones $B_X$ at the target location, an average point $\overline{X}_{MV}$ of the microphones (see X1 to X4 in FIG. 3) at the noise source is used to determine the axis of sound propagation ($\theta_{\overline{X}_{MV},Bx}$). This axis of sound propagation $\theta_{\overline{X}_{MV},Bx}$ from the sound source $\overline{X}_{MV}$ is then used to calculate the sound propagation vector $V_{prop}$ for the sound transmitted between the noise source and the microphone in town $B_X$ (step 130, FIG. 5). This average point $\overline{X}_{MV}$ is calculated in order to represent as best as possible a mean position, near the plant, of an average sound origin for a given town station $B_X$. The relations used are shown in Table 1 below.

TABLE 1

| | | |
|---|---|---|
| $\overline{X}_{MV} = \dfrac{\sum_{i=1}^{4} L_i R_i^{-1} X_i}{\sum_{i=1}^{4} L_i R_i^{-1}}$ | Relation 2 | The average coordinate near the plant from which the noise originates |
| $L_{\overline{X}_{MV}} = \dfrac{\sum_{i=1}^{4} L_i w_i}{\sum_{i=1}^{4} w_i}$ | Relation 3 | Weighted average sound level from the sound levels at $\overline{X}_{MV}$ |
| $w_i = 1 - \dfrac{|R_i - \overline{R}|}{R_i}$ | Relation 4 | Weighting coefficients of the sound levels near the noise source (plant) as a function of the distances between the microphones near the plant and station at the location ($B_X$ in town) |
| $X_i$ | | Location of microphone/near the plant |

TABLE 1-continued

| | |
|---|---|
| $\overline{R}$ | Distance between $\overline{X}$ and $B_X$ in town |
| $R_i$ | Distance between the microphone i near the plant and the station $B_X$ in town |

FIG. 3 shows the mean position $\overline{X}_{MV}$ near the noise source for which the average noise level $L_{\overline{X}_{MV}}$ for station B3 was calculated.

Reference transfer functions (FTref) between the stations near the plant (X1 to X4) and the measurement stations in town (B1 to B3) are dependent on the wind component in the sound propagation axis are thus calculated based on historical sound levels measured over a period of time. Thus, the present method integrates meteorological factors influencing the propagation of sound.

Figure 4:
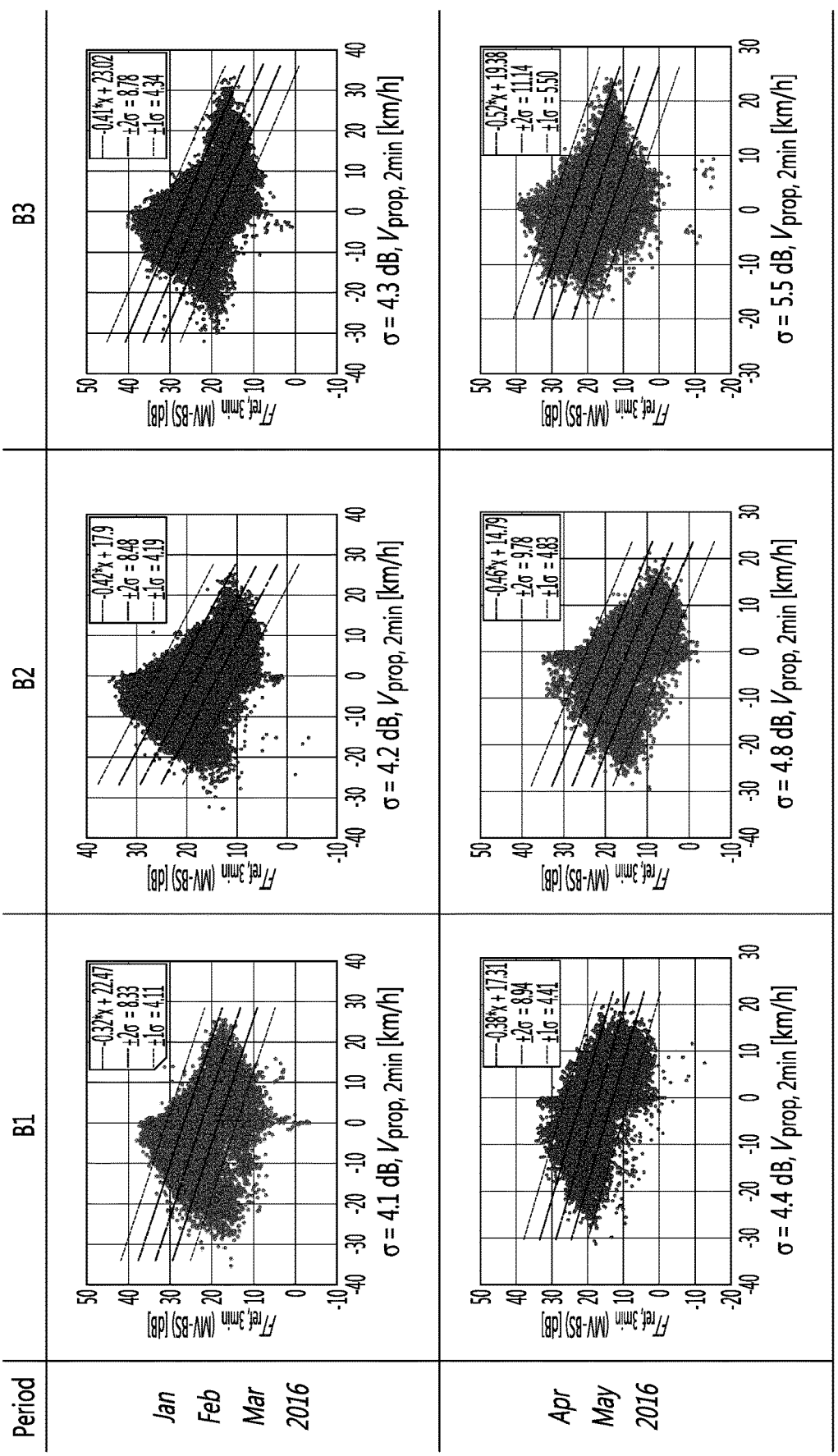
FIG. 4 shows reference transfer functions (FTref) as a function of the seasons, and per station in town Bx, according to an embodiment of an aspect of the present invention.

Reference transfer functions (FTref) as obtained are shown in FIG. 4 as a function of the wind component along the axis of sound propagation, for both winter and spring conditions at the three stations in the town (B1 to B3). The linear regression equations and standard deviations σ of the trend curves are also presented in FIG. 4. For determining these transfer functions, a number of factors were discarded, such as for example periods when the noise did not originate from the plant; adverse meteorological factors such as rain or strong wind; non-transient human activity noise, etc.

As mentioned hereinabove, the transfer functions obtained in real-time (FTmes) are compared with the reference transfer functions (FTref) for a given direction and wind speed (step 160, FIG. 5), to determine probability that the noise at the target location is due to the noise generating source under study, within a certain confidence interval (step 170, FIG. 5).

When the difference between the measured transfer function and the reference transfer function is above a predetermined threshold, it then determined, within a certain confidence interval, that the noise measured at the target location is not likely to come from the noise source (step 170 FIG. 5).

A method for estimating plant noise levels received in a nearby town is presented diagrammatically in FIG. 5.

From sound pressure signal collected by the noise monitoring stations at the noise source (example: the plant) and in the environment to be assessed (example: the town nearby), the equivalent sound pressure level average over 5 second (LMV, 5 s) at stations located near the plant (X1 to X4) (see FIG. 3) and the equivalent sound pressure level average over 5 second (LBx, 5 s) at station Bx in town (see FIG. 3) are determined. A 5 second period was selected as an approximation of a parasite noise in a town, such as a noise from a car passing by. It may be adjusted if necessary.

Rapid noise fluctuations are filtered out by low-pass filtering on all stations (step 120, FIG. 5) using digital low pass filter to filter quick noise fluctuation applied to several 5 second samples, i.e. the equivalent sound pressure level average over 5 second (LBx, 5 s) at station Bx in town is filtered out to yield a filtered equivalent sound pressure level average over a period T longer than 5 second, typically several 5 second periods, at station Bx (LF, T) in town; and the equivalent sound pressure level average over 5 second (LMV, 5 s) at stations located near the plant (X1 to X4) is filtered out to yield a filtered equivalent sound pressure level average (LMVavg, T) over a period T longer than 5 second, typically several 5 second periods, at the remote location calculated using relation 3 in Table 1 above.

The sound (LF, T) at station Bx may first be assessed in comparison to an equivalent sound pressure level X for which the noise is below a conformity threshold, and thus considered negligible (step 122): in such case, the noise effect of the plant needs not be assessed any further since the plant conforms with noise conformity requirements. Also, in case meteorological conditions impact the measurements in such a way that the noise indeed originating from the plant itself cannot be sorted out, the measurements are not valid (step 124).

Measured wind data, i.e. wind speed and direction, averaged on the period T, are used to calculate a wind vector using Relation 1 as described hereinabove in relation to FIG. 2 (step 130, FIG. 5)

The sound transfer function between the town and the plant in real time is then calculated (FTmes=LMVavg−LF at step 126, FIG. 5) and compared to reference transfer functions (FTref) measured and established over long-time periods between the town and the plant for various meteorological conditions (step 160, FIG. 5); the difference (Δ FT=FTmes−FTref) between the measured transfer function and the reference transfer function yields a probability of the origin of the noise in town being the plant (step 170, FIG. 5) at the noise level (LF, T).

For example, when the absolute value of the difference between the measured transfer function and the reference transfer function is less than 1 standard deviation described in FIG. 4 (|ΔFT|<1σ), it may be considered that the noise in town does originate from the plant, and in such cases, the filtered level LF is a valid indicator of the noise in town with more than 67% confidence for example, and equal to the present level index (Lev).

Otherwise, the filtered level LF is probably not a valid indicator of the noise in town, for example, when the absolute value of the difference between the measured transfer function and the reference transfer function is more than 2 standard deviations described (see FIG. 4 (|ΔFT|<2σ)) it may be considered that the noise in town does not originate from the plant, with more than 95% confidence for example.

Figure 6B:
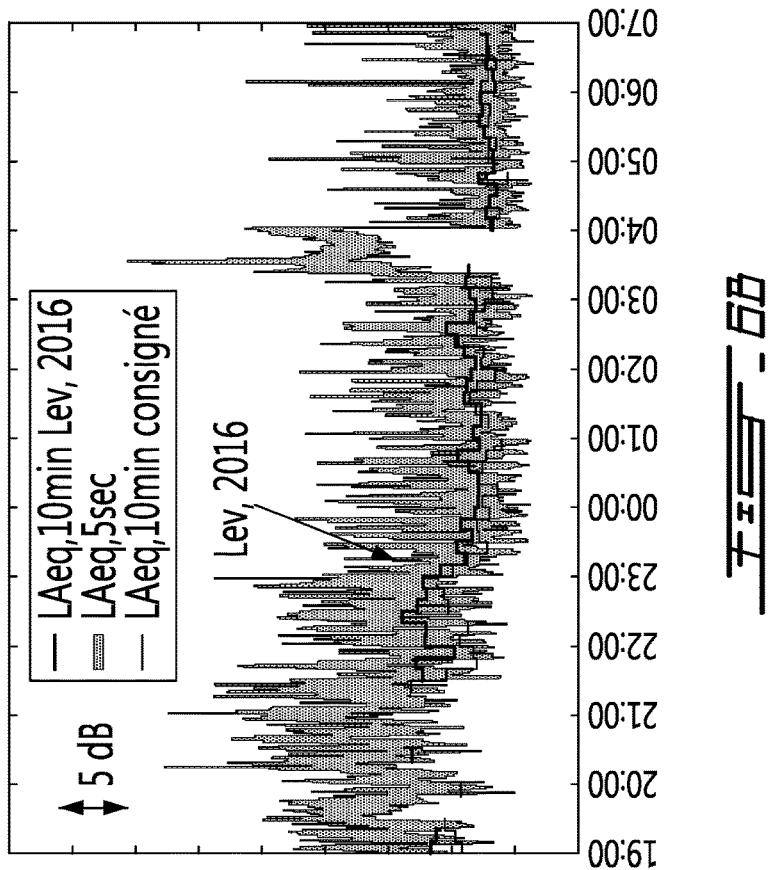
FIG. 6B shows the present level (Lev 2016) index, during a single night with short term and long-term duration noisy events in town, according to an embodiment of an aspect of the present invention.
Figure 6A:
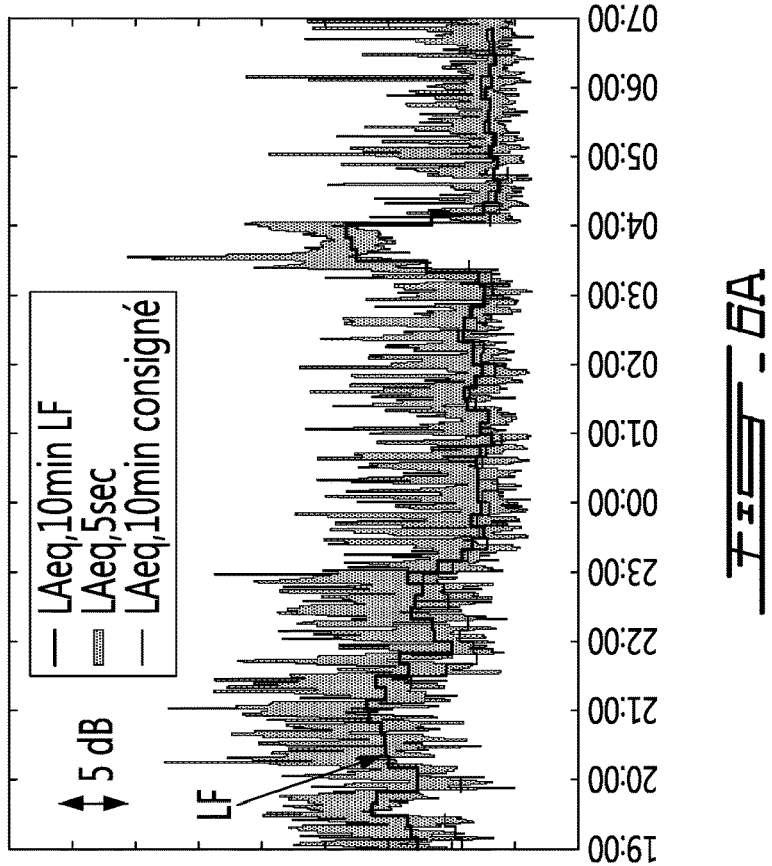
FIG. 6A shows the filtered level (LF) index during a single night with short term and long-term duration noisy events in town, according to an embodiment of an aspect of the present invention.

Thus, the present method allows discriminating long-term town events not originating from the plant (Lev, 2016 curve of FIG. 6B), which would otherwise be accepted using the low-pass filter (LF) (LF curve in FIG. 6A). In FIG. 6, (LAeq, 10 min, Lev) is the equivalent sound pressure level in dBA of the present noise level index as obtained with the present method for a 10 minute period; (LAeq, 10 min, LF) is the equivalent sound pressure level in dBA of the low pass filtered noise level for a 10 minute period; (LAeq, 10 min consigne) is the equivalent sound pressure level in dBA of the manually filtered noise level for a 10 minute period; (LAeq, 5 s) is the equivalent sound pressure level in dBA of non-filtered data for a 5 second period.

FIG. 7 shows a comparison between the hourly ambient noise level, the manual filtered noise (MF) and the present method (Lev 2016) for a time-period of one week at B3. Also shown are the unfiltered, measured ambient levels (dBA).

Tables 2 and 3 below show performances of indices LA35%, filtered level (LF), and the present level index (Lev 2016) for the 2016 winter and spring respectively in the example of the plant and town presented hereinabove.

TABLE 2

Performance of the indices in winter 2016 (dB)

| Method | Average deviation in dB (filtered method) | Standard deviation (dB) | Maximum deviation (dB) | Minimum deviation (dB) |
|---|---|---|---|---|
| LA35% index | −0.48 | 1.06 | 3.24 | −13.33 |
| filtered level (LF) index | 0.52 | 0.83 | 3.55 | −6.07 |
| present level index (Lev 2016) | −0.32 | 0.59 | 3.05 | −3.43 |

TABLE 3

Performance of the indices in spring 2016 (dB)

| Method | Average deviation in dB (filtered method) | Standard deviation (dB) | Maximum deviation (dB) | Minimum deviation (dB) |
|---|---|---|---|---|
| LA35% Index | — | — | — | — |
| filtered level (LF) Index | −0.06 | 1.12 | 11.2 | −4.96 |
| present level index (Lev 2016) | −0.23 | 0.76 | 4.09 | −4.36 |

The present level index (Lev 2016) proved to yield improved accuracy in relation to both the average deviation and standard deviation from the manual filtered noise (MF) results, except in the case of the average filtered level (LF) Index average deviation in spring 2016. The maximum and minimum deviations between the present level index (Lev 2016) and manual filtered noise (MF) levels, i.e. the spread of sound levels, were also significantly reduced in comparison to the filtered level (LF) index. The accuracy of the manual filtering for certain hours could explain some discrepancies between the levels estimated by the present method and the manual filtered noise (MF) levels.

In the example hereinabove, values of $\Delta FT<2\sigma$ were retained (See step 170 FIG. 5), providing a 95% confidence interval that the noise filtered by the present method did not come from the plant. To gain further precision, it may be contemplated selecting a parameter between $1\sigma$ (67% confidence) and $2\sigma$ (95% confidence), which would reject a few more values at stations in the town.

The present level index (Lev 2016) was further integrated into a web-based monitoring system to monitor the plant activities on site in real-time.

The method thus provides an automated prediction method for noise levels received in town from a neighbouring plant for example.

Although the present method and system were described in relation to a plant as a noise-generating source in the neighbourhood of a town, they may be used in relation to a range of sounds sources and relationships, such as construction sites, freeways, digging sites, festival sites etc. . . .

The scope of the claims should not be limited by the illustrated embodiments set forth in the examples, but should be given the broadest interpretation consistent with the description as a whole.

The invention claimed is:

1. A system, comprising:
at least a first noise monitoring station measuring noise levels amplitudes of a noise source at a first known location;
at least a second noise monitoring station measuring noise levels amplitudes at a second known location at a distance from the noise source at the first known location;
at least one meteorological station measuring wind speed and direction data in an area comprising the noise source at the first known location and the second known location; and
a controller receiving the noise levels amplitudes from the first and second noise monitoring stations and the wind speed and direction data from the meteorological station;
wherein said controller comprises a low pass-filter, said low pass-filter filtering transient short-duration events from the noise levels amplitudes measured at said first and second noise monitoring stations;
wherein, for long-duration events, said controller discriminates noise at the second known location originating from the noise source based on the measured noise levels amplitudes and the wind speed and direction data; wherein said controller comprises a comparator, said comparator comparing a measured sound transfer function between the first known location and the second known location with reference transfer functions, previously measured between the first known location and the second known location and stored over long-time periods in a range of meteorological conditions, said reference transfer functions being dependent on a wind component in a sound propagation axis, between the first known location and the second known location, and, when the difference between the measured transfer function and the reference transfer functions is above a predetermined threshold, said controller determines a probability that noise at the second known location originates from the noise emitted by the noise source at the first known location and discriminates, at the second known location, noise due to the noise source at the first known location from ambient noise in the second known location.

2. The system of claim 1, wherein each noise monitoring station comprises a microphone and a sound analyzer.

3. The system of claim 1, wherein each noise monitoring station comprises a microphone and said microphone is a directional microphone.

4. The system of claim 1, wherein each noise monitoring station comprises a microphone and said microphone is a beamforming antenna.

5. The system of claim 1, wherein said at least one meteorological station comprises wind speed and direction sensors.

6. The system of claim 1, wherein each noise monitoring station comprises a microphone and a sound analyzer, and said microphone is a directional microphone.

7. The system of claim 1, wherein the noise source at the first known location is a noise source submitted to regulatory noise survey.

8. A method, comprising:
measuring noise levels amplitudes of a noise source located at a first known location at at least a first noise monitoring station;

measuring noise levels amplitudes at a known second location at a distance from the noise source at at least a second noise monitoring station;

measuring wind speed and direction in an area comprising the noise source at the first known location and the known second location;

filtering transient short-duration events from the noise levels amplitudes measured at the first monitoring station, yielding filtered noise levels amplitudes of the noise source;

filtering transient short-duration events from the noise levels amplitudes measured at the known second location, yielding filtered noise levels amplitudes of the known second location; and for long-duration events, measuring a sound transfer function between the first known location and the known second location and comparing the measured sound transfer function between the first known location and the known second location with reference transfer functions previously measured between the first known location and the known second location and stored over long-time periods in a range of meteorological conditions, the reference transfer functions being dependent on a wind component in a sound propagation axis;

comparing the measured sound transfer function with a reference transfer function; and when the difference between the measured transfer function and the reference transfer functions is above a predetermined threshold, determining a probability that noise at the known second location originates from the noise emitted by the noise source at the first known location;

thereby discriminating, at the second known location, noise due to the noise source at the first known location from ambient noise in the second known location.

9. The method of claim 8, wherein said measuring the noise levels amplitudes of the noise source comprises positioning at least a microphone at the noise source, and said measuring the noise levels amplitudes at the known second location comprises positioning at least a microphone at the distance from the noise source.

10. The method of claim 8, wherein said measuring the noise levels amplitudes of the noise source comprises measuring the sound pressure level as a function of time.

11. The method of claim 8, wherein said measuring the noise levels amplitudes of the noise source comprises measuring the sound pressure level as a function of time and recording sound levels.

12. The method of claim 8, wherein said measuring the noise levels amplitudes of the known second location comprises measuring the sound pressure level as a function of time.

13. The method of claim 8, wherein said measuring the noise levels amplitudes of the second known location comprises measuring the sound pressure level as a function of time and recording sound levels.

14. The method of claim 8, comprising previously determining and storing the reference transfer functions between the first known location and the known second location over long-time periods in the range of meteorological conditions based on historical sound levels measured over the long-time periods and integrating wind speed and direction data.

15. The method of claim 8, comprising previously determining and storing the reference transfer functions between the first known location and the second known location and storing over long-time periods in the range of meteorological conditions based on historical sound levels measured over the long-time periods and integrating wind speed and direction data by, for given wind speed ($V_{vent}$) and wind direction ($\theta_v$) determining the wind component ($V_{prop}$) along the sound propagation axis ($\theta_{\overline{x}_{MV}Bx}$) from the noise source to the known second location as $V_{prop} = V_{vent} * \cos(\theta_v - \theta_{\overline{x}_{MV}Bx})$.

16. The method of claim 8, said measuring the sound transfer function between the first known location and the known second location is done in real-time with the reference transfer functions for a given direction and wind speed.

17. The method of claim 8, wherein the noise source is a noise source submitted to regulatory noise survey.

* * * * *